(12) United States Patent
Jaeger et al.

(10) Patent No.: US 11,149,176 B2
(45) Date of Patent: Oct. 19, 2021

(54) METHOD FOR PRODUCING AN ABRASIVE PARTICLE, AND ABRASIVE PARTICLE

(71) Applicant: VSM Vereinigte Schmirgel- und Maschinen-Fabriken AG, Hannover (DE)

(72) Inventors: Achim Jaeger, Hannover (DE); Thorsten Abel, Hannover (DE)

(73) Assignee: VSM Vereinigte Schmirgel- und Maschinen-Fabriken AG, Hannover (DE)

( * ) Notice: Subject to any disclaimer, the term of this patent is extended or adjusted under 35 U.S.C. 154(b) by 159 days.

(21) Appl. No.: 16/317,620

(22) PCT Filed: Jul. 12, 2017

(86) PCT No.: PCT/DE2017/100576
§ 371 (c)(1),
(2) Date: Jan. 14, 2019

(87) PCT Pub. No.: WO2018/010730
PCT Pub. Date: Jan. 18, 2018

(65) Prior Publication Data
US 2019/0225850 A1  Jul. 25, 2019

(30) Foreign Application Priority Data

Jul. 15, 2016 (DE) .................... 10 2016 113 125.3

(51) Int. Cl.
*C09K 3/14* (2006.01)
*B24D 3/34* (2006.01)
*C01F 7/02* (2006.01)

(52) U.S. Cl.
CPC .............. *C09K 3/1418* (2013.01); *B24D 3/34* (2013.01); *C01F 7/025* (2013.01); *C09K 3/1409* (2013.01)

(58) Field of Classification Search
CPC  B24D 18/0009; C09K 3/1409; C09K 3/1436; C09K 3/1418; C09K 3/1427
See application file for complete search history.

(56) References Cited

U.S. PATENT DOCUMENTS 4,752,498 A    6/1988  Fudim
2006/0185257 A1  8/2006  Nevoret et al.
(Continued)

FOREIGN PATENT DOCUMENTS

DE   10 2013 212 644 A1   12/2014
EP      0 651 778 B1       5/1998
(Continued)

OTHER PUBLICATIONS

Google Translation for EP-2692817-A1 (Year: 2020).*
(Continued)

*Primary Examiner* — Pegah Parvini
(74) *Attorney, Agent, or Firm* — Collard & Roe, P.C.

(57) ABSTRACT

The invention relates to a method for producing an alumina based abrasive particle (1), comprising at least the following steps:
forming a sol as a solution or dispersion of alumina particles,
gelling the sol by adding gelling agents,
forming shaped bodies from the gel using an additive procedure,
drying and firing the shaped bodies while retaining the previously achieved geometry of the abrasive particles.
Hereby, it is provided that
an optically binding binder is added to the sol and/or the gel,
the gel is applied additively layer by layer and the binder is set using electromagnetic radiation so as to form the shaped bodies.
The produced abrasive particle may be formed, in particular, by six intersecting or overlapping triangular volume regions.

8 Claims, 5 Drawing Sheets

(56) References Cited

U.S. PATENT DOCUMENTS

Figure 1:
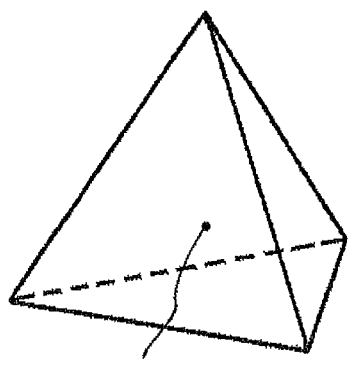
Figure 2:
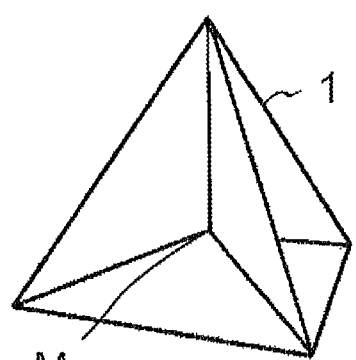
Figure 3:
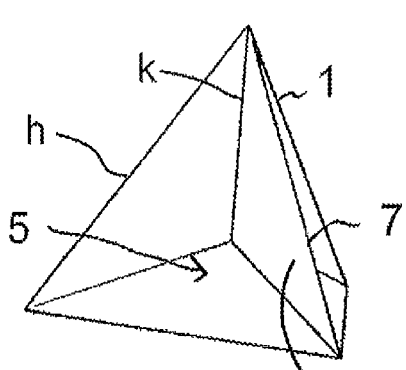
Figure 4:
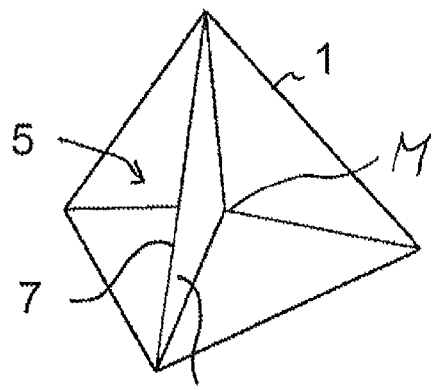

| | | |
|---|---|---|
| 2010/0283188 A1 | 11/2010 | Rohner et al. |
| 2011/0053460 A1* | 3/2011 | Culler .................. B24D 11/00 |
| | | 451/28 |
| 2011/0146509 A1 | 6/2011 | Welygan et al. |
| 2013/0125477 A1* | 5/2013 | Adefris ............... C09K 3/1409 |
| | | 51/309 |
| 2013/0236725 A1* | 9/2013 | Yener ...................... B01J 2/26 |
| | | 428/402 |
| 2014/0182216 A1* | 7/2014 | Panzarella ............. C01G 17/00 |
| | | 51/309 |
| 2015/0089881 A1* | 4/2015 | Stevenson ............ C09K 3/1409 |
| | | 51/309 |
| 2015/0259587 A1* | 9/2015 | Oldenkotte .......... C09K 3/1418 |
| | | 51/309 |
| 2016/0298013 A1 | 10/2016 | Bock et al. |

FOREIGN PATENT DOCUMENTS

| | | | |
|---|---|---|---|
| EP | 2 251 185 A1 | 11/2010 | |
| EP | 2 692 817 A1 | 2/2014 | |
| EP | 2 692 818 A1 | 2/2014 | |
| EP | 2692817 A1 * | 2/2014 | ........... C09K 3/1409 |
| WO | 2011/139562 A2 | 11/2011 | |
| WO | 2015/048768 A1 | 4/2015 | |
| WO | 2015/090283 A1 | 6/2015 | |

OTHER PUBLICATIONS

English translation of the International Preliminary Report on Patentability and Written Opinion of the International Searching Authority in PCT/DE2017/100576, dated Jan. 24, 2019.
International Search Report of PCT/DE2017/100576, dated Feb. 13, 2018.

* cited by examiner

METHOD FOR PRODUCING AN ABRASIVE PARTICLE, AND ABRASIVE PARTICLE

CROSS REFERENCE TO RELATED APPLICATIONS

This application is the National Stage of PCT/DE2017/100576 filed on Jul. 12, 2017, which claims priority under 35 U.S.C. § 119 of German Application No. 10 2016 113 125.3 filed on Jul. 15, 2016, the disclosure of which is incorporated by reference. The international application under PCT article 21(2) was not published in English.

The invention relates to a method for producing an abrasive particle as well as an abrasive particle that may be produces, in particular, using the method according to the invention.

Ceramic abrasive particles on the basis of alumina are used in many ways in abrasives like abrasive belts and abrasive discs. The abrasive particles are formed in a polycrystalline manner from α-alumina usually containing additives.

Sol gel processes are known for manufacturing such abrasive particles wherein an alumina based primary material, for example boehmite, is formed as an aqueous dispersion of nano crystalline parts or as a solution, with the sol subsequently being gelled by adding gelling agents such as, inter alia, nitric acid, and the gel subsequently being converted into α-alumina by means of a thermal treatment.

Hereby, the gel can be applied as a layer onto a substrate said layer subsequently being dried calcined and fired so that a fired plate can subsequently be crushed and classed.

Moreover, methods are known utilizing the shaping of the gel material. The document WO 2011/139562 A2 describes a method wherein the gel is entered into moulds so as to shape tetrahedal shaped bodies or green bodies which subsequently are subjected to thermal treatment. The citation EP 0 651 778 shows such abrasive particles being manufactured having a triangular base and plane-parallel surfaces.

However, complex shapes of abrasive particles are generally laborious. Moreover, for example, it is laborious to fill the gel into mould inserting recesses on a support and to release if after firing.

The document EP 2 251 185 A1 describes a method for generatively producing a shaped body as a green body for a dental restauration whereby material which can be cured using the influence of electromagnetic radiation is applied and cured each in a multiplicity of exposure steps in layers.

The invention is based on the object of creating a method for producing ceramic abrasive grains and a ceramic abrasive particle allowing for safe manufacturing and good abrasive properties.

This task is solved by means of a method and an abrasive particle according to the independent claims. Das abrasive particle according to the invention can be produced, in particular, using a method according to the invention. The sub-claims describe advantageous further developments. Hereby, further, a grinding article containing the abrasive particles is provided.

Thus, in the method according to the invention, the shaped bodies or green bodies respectively are formed by additive application, In particular, they can be formed by adding an optical binder to the sol or gel, successively and layer by layer applying the gel material and curing it by means of an optical binder which cures under electromagnetic radiation of a specific frequency. Thus, in the applied gel layers electromagnetic radiation can be focused in such a way that areas are cured locally so that the shaped bodies or green bodies respectively are formed layer by layer.

Such methods for manufacturing shaped bodies are also known as "3D printing," because a surface is applied successively and a shaped body is formed by curing or applying material to pre-defined areas. Thus, the shaped bodies or green bodies respectively of the abrasive particles are formed from the gel material by means of 3D printing.

Thus, when utilizing an optically binding binder, the binder cures first and secures the shapes of the shaped bodies so that, for example, excessive gel material can be subsequently washed out. In the course of the subsequent thermal treatment, i.e. the calcination or sintering of the gel material of the shaped bodies in a manner known as such, the binder evaporates or oxidizes.

The process of additive application with optical binding can be carried out, in principle, according to the citation EP 2 251 185 A1, however, alternative methods of 3D printing may be employed, in particular, involving other layer thicknesses and degrees of penetration of the optical radiation.

According to the invention, the optical curing of the binder may already lead to drying of the shaped body in total or in part so that only a short additional drying step may be required or the calcination may happen immediately thereafter.

The invention, in particular, leads to the advantage that complex and demanding shapes of abrasive grains can be achieved in principle.

Hereby, many abrasive particles can be formed space-savingly next to each other whereby, for example, positions may be formed alternatingly on a face area (base surface) and a to face so that the abrasive particles can be packed densely with little space in-between.

The abrasive particle according to the invention comprises six essentially plane-parallel volume bodies, each having two triangular walls essentially parallel to each other and a ridge face. Hereby, the volume bodies may be formed, in particular as plane-parallel, triangular, ridges or pads each having a ridge face.

The triangular walls comprise two cathetuses of equal length joining at a central area of the abrasive particle and a longer hypotenuse, i.e. the hypotenuse is longer than the cathetuses.

In accordance with a preferred embodiment, the abrasive particle is formed exclusively from these six volume bodies or, respectively, ridges or pads which overlap or merge respectively in the central region.

Preferably, the tops are flattened so that top faces are shaped e.g. as plane, triangular, equal-sided top faces. Thus, such an abrasive particle preferably comprises merely three types of edges, namely twelve cathetuses of equal length, twelve hypotenuses of equal length, and twelve sides of the top faces of equal length, whereby the length of the sides corresponds to the wall thickness (pad thickness); preferably, six rectangular ridge faces and four triangular top faces which together form the outer faces and, furthermore, twelve triangular ridge faces are formed.

Thus, the outside shape of the abrasive particle is preferably defined by the ridge faces and the top faces. The ridge walls define recesses and extend towards the centre.

This creates a shape in which the points of contact of all cathetuses of the ridges join at about the centre of gravity of the abrasive particle.

Thus, when applied to a substrate, such an abrasive particle will always fall onto a face area so that a top, preferable having a flattened top, will extend upwards. The self-orienting, stabilising and symmetrical shape supports the abrasive particle against lateral loads or tilting moments in every direction.

Upon grinding, the top face is removed and then, successively, the triangular ridge walls are removed.

It is apparent that abrasive particles with such ridge walls provide for a good abrasive performance; the abrasive effect or the grinding removal respectively is consistent, in particular also consistent when abrasive reaction forces are applied from differing directions.

The shape of the lateral faces recessed in relation to the ridge faces allows for a form-fit integration of the abrasive particles in the binder material used as casting compound. Thus, the abrasive particles may be deposited with a face area onto the substrate material, for example a fabric; since they each fall upon one of the three face areas defined by three hypotenuses it is, as a matter of principle, not necessary to provide for a laborious alignment, for example by means of an electrostatic charge etc. . . . The abrasive particles can then be ingested in a binder material which engages in the recesses of the face areas in a form-fit way thereby securely holding the abrasive particles.

A wall thickness ratio is defined as the relation of the wall thickness compared to the length of the hypotenuse; it determines the stability and total height of the abrasive particle. Hereby, with increasing wall thickness ratio the stability is increased against lateral loads and tilting moments occurring during a grinding procedure; on the other hand, the total height or, respectively, the total height per mass of the abrasive particle which is relevant for the grinding performance and also for the maximum possible surface density and, hence, granulation decreased with increasing wall thickness ratio. Hereby, it is apparent that a wall thickness ratio in a range from 0.05 to 0.5 is advantageous.

Figure 5:
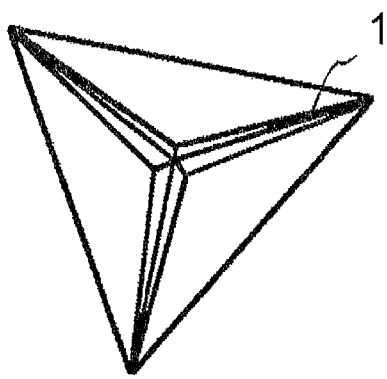
Figure 6:
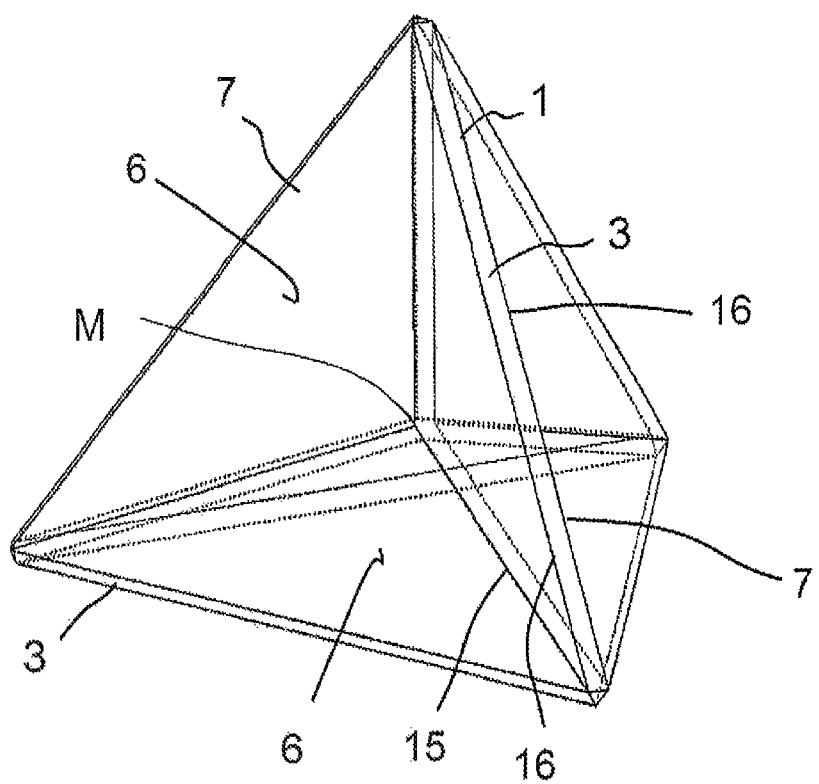
Figure 8:
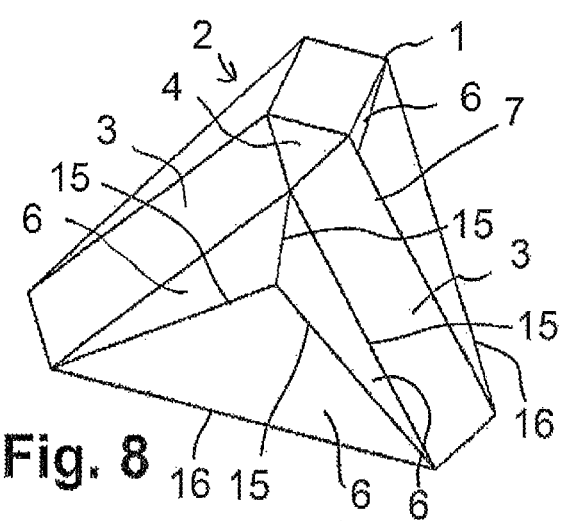
Figure 9:
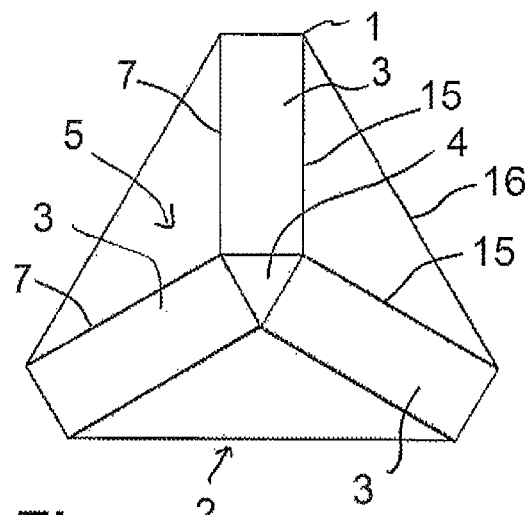
Figure 10:
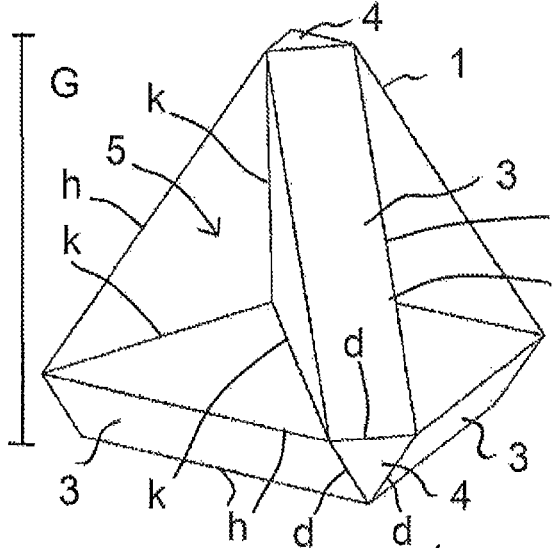
Figure 11:
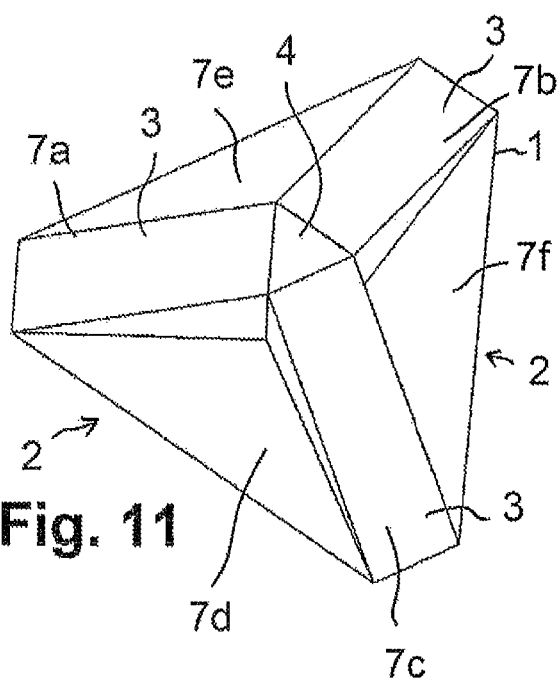
Figure 12:
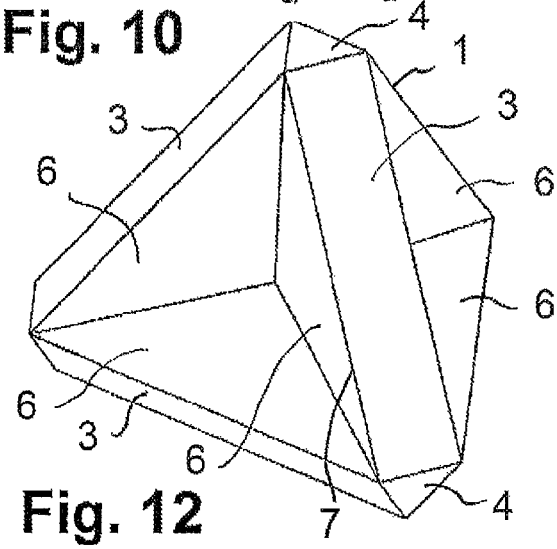
Figure 13:
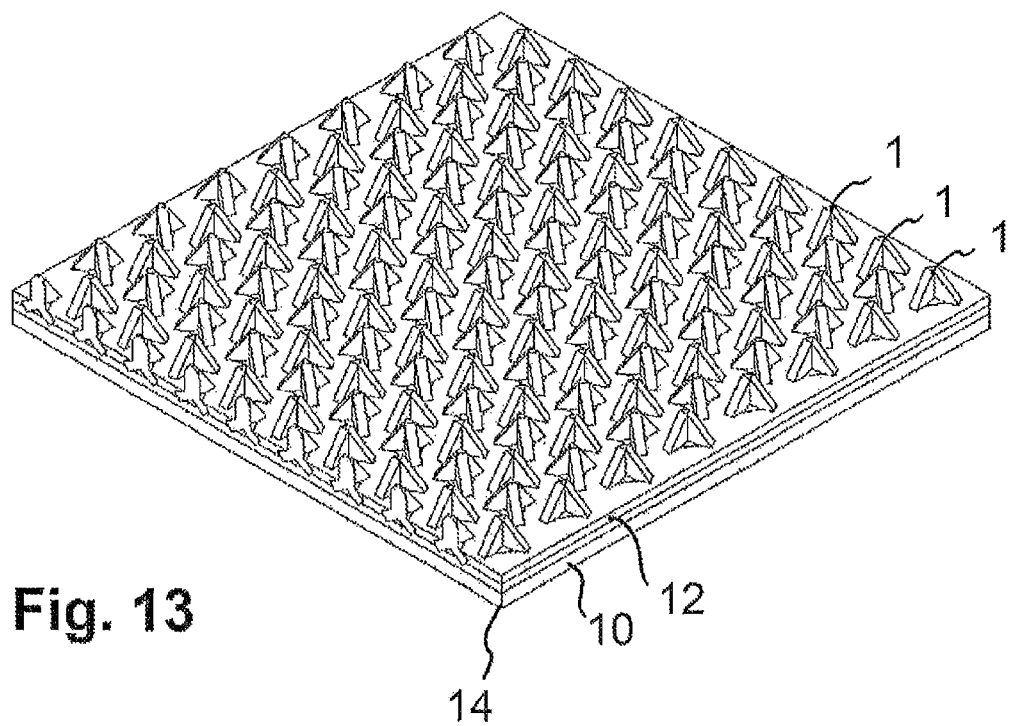
Figure 14:
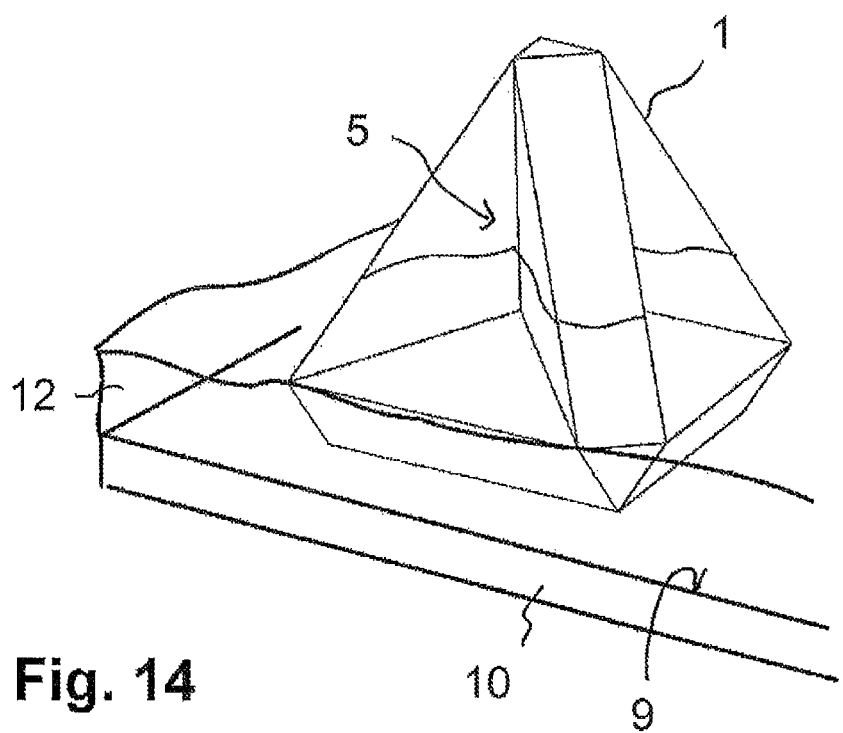
Figure 15:
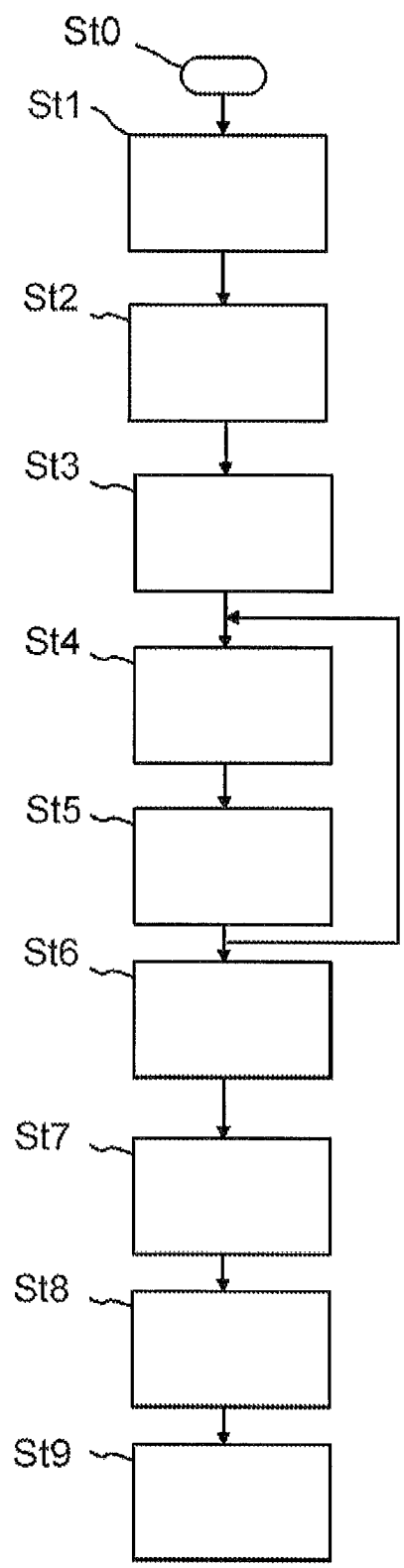

The invention is subsequently illustrated on the example of a few embodiments by means of the accompanying drawings. These show in:

FIG. 1-4 schematic representations of the geometric shapes of an abrasive particle according to an embodiment of the invention, in various perspective views;

FIG. 5 an elevation of an abrasive particle corresponding to FIG. 1-4 with widening ridges;

FIG. 6, 7 transparent images of an abrasive particle according to an embodiment of the invention, in various perspective views;

FIG. 8 a perspective view of an abrasive particle according to an embodiment of the invention;

FIG. 9 an elevation of the abrasive particle according to FIG. 8;

FIG. 10-12 further perspective views of the abrasive particle from FIGS. 8, 9;

FIG. 13 a grinding article comprising a multiplicity von abrasive grains;

FIG. 14 an enlarged detail from FIG. 13 with the integration of an abrasive particle on the grinding article;

FIG. 15 a flow chart of a method for producing the abrasive particles according to an embodiment of the invention.

Figure 7:
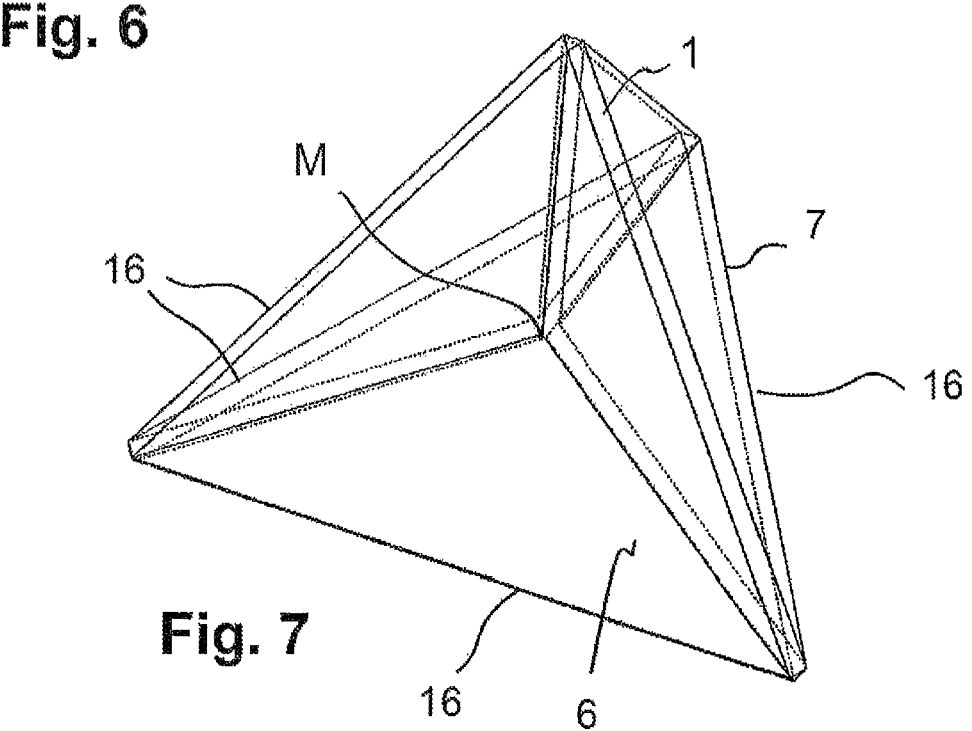

An abrasive particle 1 on the basis of α alumina (aluminium oxide, Al2O3) is shown in more detail in the embodiment of FIGS. 6, 7 as well as the embodiment of FIGS. 8 through 12 and formed by six identical ridges 7 (volume bodies) that approach each other towards a central region in, or as shown in an idealized manner in FIG. 1, towards a centre point M. The ridges 7 area each planparallel with two parallel triangular ridge walls 6 and a ridge face 3 connecting the ridge walls 6. Thus, the ridge face 3 always lies perpendicular with respect to the two ridge walls 6. Three ridge faces 3 each join in a top face 4 which thereby forms a equal sided triangle having a side length corresponding to the wall thickness d of the ridges 7 (see, in particular, the indications of the geometric distances or lengths respectively in FIG. 10). The ridge walls 6 each form an equal sided triangle with two cathetuses 15 of the cathetus length k extending inwards from a top face 4 and a hypothenuse 16 of the hypothenuse length h connecting two top faces 4, where h>k.

For illustration purposes in FIG. 11 the six ridges are designated as first ridge 7a, second ridge 7b, third ridge 7c, fourth ridge 7d, fifth ridge 7e, and sixth ridge 7f. The six ridges 7a through 7f join towards the middle in transition areas extending outwards towards the top faces 4, or, one could say, these transition areas represent overlaps of the ridges 7 extending inwards.

Thus, the ridge faces 3 are—as can be seen, in particular, in the embodiment of FIGS. 8 through 12—rectangular towards the edges h and d.

Thus, the abrasive particle 1 deviates from the ideal outer shape of a tetrahedron with a centre point M as shown in FIG. 1; however, it exhibits a tripartite symmetry, i.e. four tripartite axes. Compared to the tetrahedron shape the lateral faces 2 recessed inwards towards the centre point M whereby the lateral faces 2 are limited each by three hypotenuses 16 and the recesses 5 are each defined by three cathetuses 15 or three ridge walls 6 respectively.

Thus, each ridge 7 is formed having one outer ridge face 3 between two recesses 5.

Thus, the points of contact of all cathetuses 15 of the ridges 7 join at about the centre of gravity M of the abrasive particle 1.

In deviation from this embodiment, for example, versions with ridge walls 6 are possible that do not run exactly parallel so that no ridges are created with a consistent thickness but rather, for example, becoming somewhat thicker from their ridge faces 3 towards the middle or, respectively, run non-planar or planar but not parallel.

Thus, the abrasive particles 1 form a symmetrical body which automatically stands always on one lateral face 2, i.e. three hypotenuses 16. This is shown in more detail, for example, in FIG. 14: the abrasive particle 1 lies on one upper face 9 of a substrate 10 formed e.g. by a fabric. Further, on the upper face 9 of the substrate 10 a binder material 12 is applied as casting compound covering the lower region of the abrasive particles 1 leaving open an upper region. The binder material 12 cures thereby allowing the creation of a grinding article 14 according to FIG. 13 where a multiplicity of abrasive grains 1 is fixed on a substrate, e.g. a fabric 10, and in which binder material 12 is fixed and secured. Hereby it can be seen, for example, from FIG. 13 in the edge regions, that the lower region of the abrasive particle 1 is surrounded by the binder material 12 in a form-fit manner because the Binder 12 always enters the recesses 5 of the abrasive particles 1 thereby surrounding the ridge walls 6, in particular, in the lower, widened region of the abrasive particles 1.

Further, the tripartite shape of the abrasive particle 1 exhibits a strong resistance against tilting against loads in any direction because—as can be seen, in particular, from the views of FIGS. 9 and 11—every tilt moment is countered by one or two ridges 7.

A wall thickness ratio w is defined as the ratio of the wall thickness d to the hypothenuse length h, i.e.

$$w = d/h$$

The wall thickness ratio w determines the stability, i.e. in particular the resistance against tilting, and a total height G of the abrasive particle 1. The embodiment of FIGS. 6, 7 shows ridges 7 with a small wall thickness ratio w; the preferred embodiment of FIGS. 8 through 12 shows ridges 7 with a larger wall thickness ratio w, preferably lying in the range between 0.05 and 0.5.

The arrangement of the abrasive particles 1 on the substrate 10 according to FIG. 13 may be regular or irregular.

The creation of the abrasive particles 1 happens in accordance with the flow chart of FIG. 15 by means of a sol gel process with additive application, also referred to as "3D printing:"

Following commencement in St0, a sol is generated in step St1 in that, for example, nano particles of alumina are treated in an aqueous dispersion, for example, as boehmite, e.g. with additives (step St1). Subsequently, in step St2 a gel is created from this sol in that gelled substances, for example nitric acid, are added. Further, in step St3, an optical binder is added which cures upon receiving electromagnetic radiation of a specific frequency, e.g. in the UV range. In addition (e.g. in step St1 or St2) α alumina seeds, i.e. α alumina mono-crystals may be added for later crystallite generation, as it is known as such in sol gel processes.

In step St4, the gel so generated is successively applied layer by layer onto a base whereby, after a layer has been applied, subsequently, according to step St5, the gel material is cured at the desired spots of the material by means of a laser having the relevant frequency and being suitably focussed, and at other spots remains as non-cured mass or is being removed. The steps St4 through St5 can be repeated successively until the shaped bodies have been completed. The remaining gel mass may be removed subsequently, in step St6, or even upon completion of each step St5 of optical curing.

Thus, a 3D print or an additive application or ablation from the gel phase is achieved by means of laser curing whereby on a substrate a multiplicity of abrasive grains 1 are created from gel with optically cured binder. The abrasive particles 1 may be placed closely together on the substrate, i.e., in particular, more densely than on the manufactured grinding article of FIG. 14, whereby the abrasive particles 1 upon production are formed e.g. alternatingly on a lateral face 2 and on a top face 4, i.e. interleaved, but spaced apart, so as to create a high number of abrasive grains 1 on a substrate.

Subsequently, the green bodies so generated, which already exhibit the desired shape of the abrasive particles 1, are subjected to thermal treatment. Already, the Laser treatment has led to heating, which may already have fulfilled the step of drying; otherwise, for example, the following steps are carried out subsequently:

if required, further drying in step St7
calcining at about 800° Celsius in step St8 whereby the Binder is oxidized,
firing at about 1400° Celsius in step St9.

The alumina based abrasive particles 1 so generated are subsequently further processed, for example, to produce the grinding articles 14 according to FIG. 13.

LIST OF REFERENCE NUMERALS (PART OF THE DESCRIPTION)

1 abrasive particle
2 lateral face
3 ridge face
4 triangular top face
5 recess
6 wall, preferably ridge wall
7 volume body, preferably ridge
7*a* first ridge
7*b* second ridge
7*c* third ridge
7*d* fourth ridge
7*e* fifth ridge
7*f* sixth ridge
9 upper face
10 substrate, e.g. fabric
12 binder material
15 cathetus
16 hypotenuse
M centre point
k cathetus length
h hypotenuse length
d wall thickness (arm length of the top face 4)
St0 start
St1 step of forming a sol
St2 step of forming a gel
St3 step of adding an optical binder
St4 step of successive and layer by layer application onto a base
St5 step of binding/curing the gel material using a laser
St6 step of removing remaining gel mass
St7 step of drying, may be carried out in St5 already
St8, St9 thermal treatment of the green bodies
St8 step of calcining at about 800° Celsius with oxidization of the binder
St9 step of firing at about 1400° Celsius

The invention claimed is:

1. An alumina based abrasive particle, comprising six essentially plane-parallel volume bodies, each volume body always comprising two triangular walls essentially parallel to each other and a ridge face and the triangular walls always comprising two cathetuses of equal length and joining at a central region of the abrasive particle and a longer hypothenuse.

2. The abrasive particle according to claim 1, wherein it is formed exclusively from the volume bodies and intermediate regions connecting the volume bodies or representing overlaps of the volume bodies.

3. The abrasive particle according to claim 1, wherein it comprises essentially a flattened tetrahedal outer shape having essentially four lateral regions each having a triangular shape, the six ridge faces being formed between the lateral regions, and recesses being formed in the lateral regions.

4. The abrasive particle according to claim 1, wherein always three ridge faces join in a top face and the abrasive particle comprises four triangular, equal-sided top faces.

5. The abrasive particle according to claim 4, wherein the volume bodies are provided as plane-parallel pads or ridges with a consistent wall thickness.

6. The abrasive particle according to claim 5, wherein a wall thickness ratio is defined as the ratio of the wall thickness to the hypothenuse length and lies in the range between 0.05 and 0.5.

7. The abrasive particle according to claim 1, wherein it is formed from polycrystalline α alumina material.

8. A grinding article, comprising:
a substrate having an upper face
on the upper face of the substrate a multiplicity of abrasive grains according to claim 1, and a binder material applied to the upper face of the substrate and surrounding a lower region of the abrasive particles.

\* \* \* \* \*